Sept 10, 1957 W. E. LARGE 2,806,142
ELECTRIC DISCHARGE APPARATUS
Filed July 19, 1954 3 Sheets-Sheet 1

Fig.1A.

INVENTOR
William E. Large
BY
Hymen Diamond
ATTORNEY

Fig.2.

United States Patent Office 2,806,142
Patented Sept. 10, 1957

2,806,142

ELECTRIC DISCHARGE APPARATUS

William E. Large, Lancaster, N. Y., assignor to Westinghouse Electric Corporation, East Pittsburgh, Pa., a corporation of Pennsylvania Application July 19, 1954, Serial No. 444,318

10 Claims. (Cl. 250—27)

This application is a continuation-in-part of my application Serial No. 411,385, filed February 19, 1954 and assigned to Westinghouse Electric Corporation. The invention of this application relates to electric discharge apparatus and has particular relation to control apparatus of the electronic type for resistance welders.

Such control apparatus in its most rudimentary form includes a Power Supply Unit, a Heat Control Unit and a Sequence Timer and these components cooperate with a Welder to control the magnitude and duration of the welding current. The Power Supply Unit is usually connected to supply current to the primary of the welding transformer and through it the power for welding is derived. In present day welding it is desirable that the welding power thus supplied be precisely controlled, and to this end the Power Supply Unit is controlled by the Sequence Timer and the Heat Control Unit. The Sequence Timer includes a plurality of components for timing the various operations of the Welder: the number of these operations may be many or few, depending on the complexity or simplicity of the Welder. Among these operations is included the weld operation itself and for timing this operation, the Sequence Timer includes a discharge device called the weld device, weld tube or weld thyratron which is usually rendered conducting during the weld interval; this device when it conducts actuates the Power Supply Unit to supply power to the Welder during the weld time interval. The Heat Control Unit controls the magnitude of the power which is supplied for welding during the weld interval. Usually this control is effected by rendering the discharge devices of the Power Supply Unit, through which the welding current is supplied and which are called the main discharge devices, conducting at predetermined instants in the periods of the alternating current supply from which the power is derived. The Heat Control Unit is rendered effective when the weld discharge device of the Sequence Timer conducts and remains effective so long as this device conducts.

The operation of the Heat Control Unit depends on the power factor of the welding load being supplied. Where this power factor is substantially less than unity, the Heat Control Unit is set to fire the main discharge device substantially later than the zero instants in the periods of the supply. Under such circumstances, the Heat Control Unit may be of the type disclosed in Stadum et al. Patent 2,623,168 which briefly includes a pair of thyratrons (74 and 77) connected in series with a single thyratron (73) and energized from a center-tapped winding of a transformer (129) to supply pulses to fire the discharge devices of the Power Supply Unit through an output transformer (24). The situation often arises where the power factor is substantially unity and at this power factor it is desirable that the main discharge devices of the Power Supply Unit be rendered conducting very early in their positive half periods of the supply. I have found that under such circumstances the Heat Control Unit as disclosed in the Stadum et al. patent is unsatisfactory.

It is accordingly an object of my invention to provide welding apparatus including heat control facilities capable of varying the power supplied for welding over a wide range from substantially zero welding current up to the welding current corresponding to the firing of the main discharge devices substantially at the beginnings of their positive half periods.

My invention in its broadest aspects arises from the discovery that in the Heat Control Unit as disclosed in the Stadum et al. patent when the discharge devices (74 and 73 or 77 and 73) are once rendered conducting during a half period of the supply, they continue to conduct not only during this half period but also during a portion of the subsequent half period. Thus, when one set of these controlling discharge devices are rendered conducting early in a half period of a supply to render one (or a group) of the main discharge devices conducting during this half period, the other set of controlling discharge devices cannot be rendered conducting at the beginning of the succeeding half period, since the first set is at this time still conducting. This discovery led me to the conclusion that the Heat Control Unit must be of a type in which the pulse which renders one of the discharge devices of the Power Supply Unit conducting is terminated soon after it performs its function. Heat control units capable of producing such pulses of which I am aware, however, are of complex structure and are interconnected in a complex manner with the Sequence Timer and the Power Supply Unit.

It is accordingly a more specific object of my invention to provide welding apparatus of relatively simple structure including a Sequence Timer and a Heat Control Unit which shall cooperate to produce welding current variable over a wide range from zero magnitude up to a magnitude corresponding to that produced by firing the main discharge devices of the Power Supply Unit early in the half periods of the power supply.

An incidental object of my invention is to produce such welding apparatus in which the flow of welding current during an even number of half periods of the supply shall be assured.

An incidental object of my invention is to provide a novel electronic circuit particularly suitable for welding apparatus of the type just described.

In accordance with my invention I provide welding apparatus including a Sequence Timer of the usual structure, and a Heat Control Unit of the type that operates to control the firing of the main discharge devices of the Power Supply Unit by charging and discharging a capacitor through a pair of controlled electric discharge devices. In such a Unit it is necessary that the controlled discharge devices be by-passed by asymmetric conductors to maintain the continuity of the charge and discharge of the capacitor. In accordance with my invention only one of the controlled discharge devices is bypassed by a rectifier which permits current of opposite polarity than that conducted by the discharge device to flow to the capacitor; the other controlled discharge device of the Heat Control Unit is bypassed by the weld discharge device of the Sequence Timer. Then so long as the weld device is non-conducting the Heat Control Unit remains quiescent. Thus the weld device of the Sequence Timer serves two purposes; it bypasses the controlled device of the Heat Control Unit and maintains the Heat Control Unit quiescent in the standby condition of the apparatus. In effect then the weld device in my apparatus replaces a rectifier and a blocking tube and circuit for the Heat Control Unit.

In addition, the Heat Control Unit derives its power from the transformer which supplies the Sequence Timer.

Because of this interconnection of the Sequence Timer and the Heat Control Unit the welding current is at all times supplied during an even number of half periods of the supply and saturation of the welding transformer is avoided. Highly reliable welding apparatus of relatively simple structure, considering the function which it is to perform, is thus provided.

In accordance with a specific aspect of my invention, the two discharge devices of the Heat Control Unit are the discharge paths of a double triode. Thus, further simplicity and reliability is achieved.

Figure 1A:
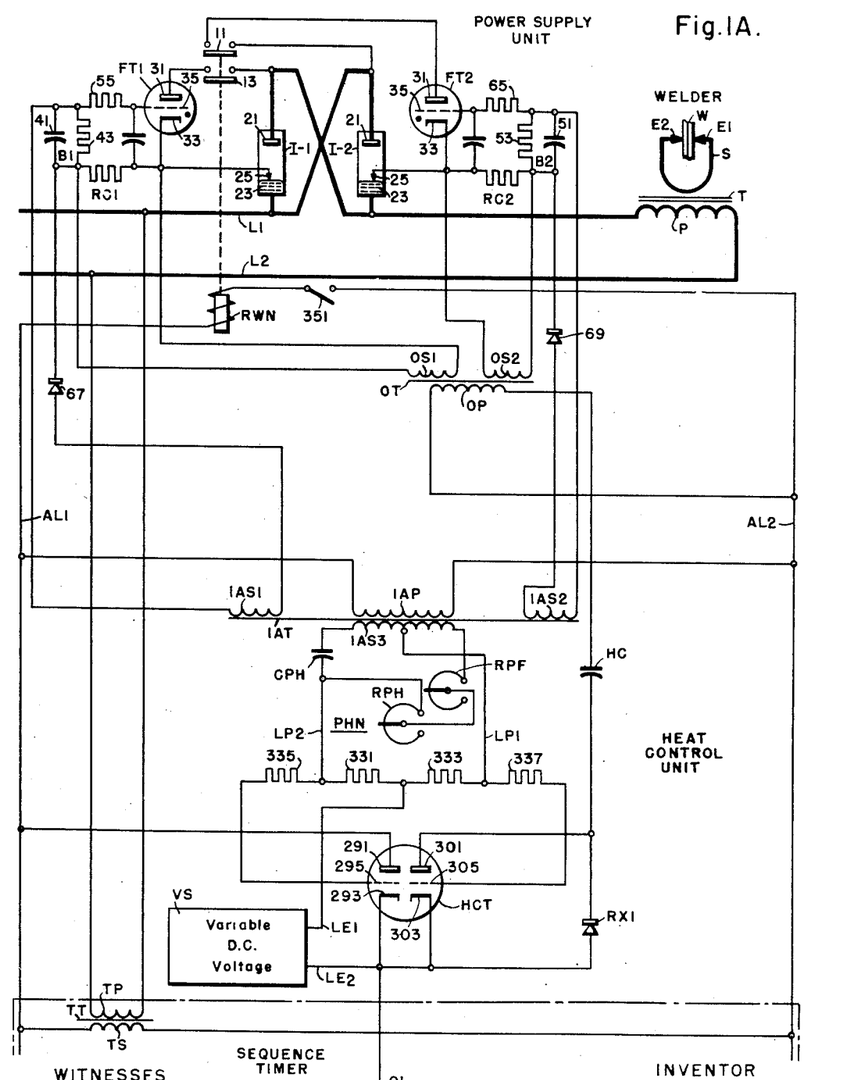
Figures 1A and 1B together are a circuit diagram of a preferred embodiment of my invention.
Figure 1B:
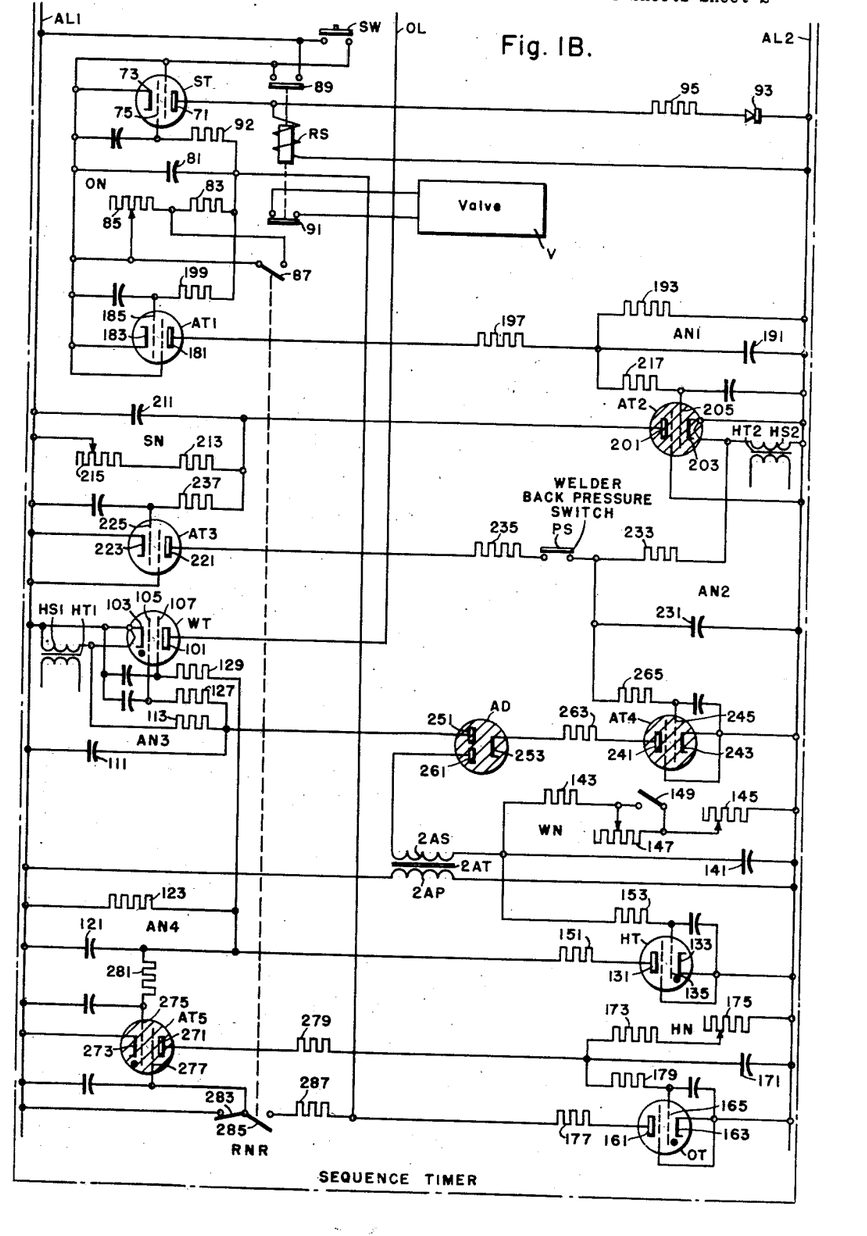

The novel features that I consider characteristic of my invention are set forth generally above. My invention itself, both as to its origination and its method of operation, together with additional objects and advantages thereof will be understood from the following description of specific embodiments when read in connection with the accompanying drawings, in which:

DESCRIPTION—FIGS. 1A and 1B

The apparatus shown in Figs. 1A and 1B includes a Welder, a Power Supply Unit, a Heat Control Unit and a Sequence Timer. This apparatus is supplied from main power supply conductors L1 and L2 which derive their power from a commercial supply rated at 220, 440 or a higher voltage. For supplying the auxiliary components which require a different voltage than that available at conductors L1 and L2, conductors AL1 and AL2 are provided. In describing the structure of the units and their cooperative relationship, it appears desirable to describe first the Welder, then the Power Supply Unit, then the Sequence Timer and finally the Heat Control Unit.

The Welder includes a welding transformer T having a primary P and a secondary S. Across the secondary, welding electrodes E1 and E2 are provided, and between these electrodes the work W is clamped during a welding operation. The Welder also usually has various mechanisms for facilitating the carrying out of a welding operation including a pneumatic system for engaging and disengaging the electrodes E1 and E2 and the work W, a valve V for controlling this system and a back pressure switch PS for assuring that the pressure at the work is proper before the welding current is permitted to flow. These components are not shown in connection with the Welder, since they do not concern this invention. The valve V and the switch PS are shown in the Sequence Timer diagram in the interest of facilitating the explanation of the invention.

The Power Supply Unit includes a pair of ignitrons I–1 and I–2 and a pair of thyratrons FT1 and FT2 for controlling the firing of the ignitrons. The thyratrons are connected to the ignitrons through the contacts 11 and 13 of a weld-no-weld relay RWN.

Each of the ignitrons has an anode 21, a cathode 23 and an igniter 25. Each of the thyratrons FT1 and FT2 has an anode 31, a cathode 33 and a control electrode 35. The anodes 21 and cathodes 23 of the ignitrons I–1 and I–2 are connected in inverse parallel or anti-parallel between the conductors L1 and L2 and the primary P and thus are capable of supplying controlled alternating current to the primary P. The anode 31 of each firing thyratron FT1 or FT2 is connected to the anode 21 of the corresponding ignitron I–1 and I–2 through the corresponding contact 11 or 13 of the relay RWN. The cathode 33 of each of the firing thyratrons is connected directly to the igniter 25 of the corresponding ignitron. Each of the firing thyratrons FT1 and FT2 is in the quiescent or standby condition of the apparatus biased to non-conductivity by a biasing network B1 and B2 consisting of a capacitor 41 and 51 shunted by a resistor 43 and 53. Each biasing network is supplied from a secondary 1AS1 and 1AS2 of an auxiliary transformer 1AT, each secondary (1AS1 and 1AS2) being connected to the associated network B1 or B2 through a rectifier 67 and 69. The primary 1AP of the transformer 1AT is supplied from conductors AL1 and AL2 of the Heat Control Network. Each network is connected at one terminal to the control electrode 35 of the associated thyratron FT1 and FT2 through a grid resistor 55 and 65. It is connected at the other terminal to the cathode 33 of the associated thyratron through a resistor RC1 and RC2 across which a potential derived from the Heat Control Unit for counteracting the bias may be impressed. For this purpose the secondaries OS1 and OS2 of an output transformer OT in the Heat Control Unit are connected respectively across the resistors RC1 and RC2.

The Sequence Timer includes a squeeze thyratron ST, a weld thyratron WT, a hold thyratron HT and an off thyratron OT. In addition, the Sequence Timer includes a plurality of auxiliary thyratrons AT1, AT2, AT3, AT4 and AT5. Further, the Sequence Timer includes a plurality of timing networks, a squeeze network SN, a weld network WN, a hold network HN and an off network ON and a plurality of auxiliary networks AN1, AN2, AN3 and AN4. The above described networks and discharge devices are interconnected in an electrical circuit and are supplied with potential from the buses AL1 and AL2 which are energized from a transformer TT having a primary TP and a secondary TS. The primary TP is supplied from the conductors L1 and L2. The secondary is connected to supply auxiliary conductors AL1 and AL2.

The squeeze thyratron ST includes an anode 71, a cathode 73 and a control electrode 75. The off network ON includes a capacitor 81 shunted by a fixed resistor 83 and a variable resistor 85. The variable resistor 85 may be shunted out by a contact 87 of a repeat-non-repeat switch RNR when this switch is in the nonrepeat position. The anode 71 is connected to conductor AL2 through the exciting coil of a start relay RS. The start relay RS has a pair of normally open contacts 89 and 91. The cathode 73 is adapted to be connected to the conductor AL1 alternatively through the normally open contact 89 of the relay RS or through a start switch SW which may be the usual foot switch of the Welder. The on network ON is connected between the control electrode 75 and the cathode 73 of the squeeze thyratron ST through a grid resistor 92.

The coil of the relay RS is shunted by a rectifier 93 and a resistor 95 which prevent the relay from chattering. The other normally open contact 91 of the relay RS is connected to control the valve V.

The weld thyratron WT has an anode 101, a cathode 103, a first control electrode 105 and a second control electrode 107. The network AN3 includes a capacitor 111 shunted by a fixed resistor 113 and the secondary windings HS1 of the heater transformer HT1 for the thyratron WT. This network AN3 has a time constant such that when the capacitor is charged and permitted to discharge, it reaches a potential such as to permit thyratron WT to conduct in a short time interval less than a half period of the supply. The network AN4 includes a capacitor 121 shunted by a resistor 123, and it also has a short time constant like the network AN3. The anode 101 of the thyratron WT is connected to an output conductor OL which is terminated in the Heat Control Unit. The cathode 103 of the thyratron WT is connected directly to the conductor AL1. The network AN3 is connected between the first control electrode 105 of the thyratron WT and the cathode 103 through a grid resistor 127. The network AN4 is connected between the second control electrode 107 and the cathode 103 of the thyratron WT through another grid resistor 129.

The hold thyratron HT includes an anode 131, a cathode 133 and a control electrode 135. The weld network WN includes a capacitor 141 shunted by a fixed resistor 143 and a pair of variable resistors 145 and 147, one of which (147) may be shunted out by a switch 149 when it is desired that the timing of the network WN be short. The anode 131 of the thyratron HT is connected to the conductor AL1 through the network AN4 and an anode resistor 151. The cathode 133 of the thyratron HT is connected to the conductor AL2 directly. The network WN is connected between the control electrode 135 and the cathode 133 through a grid resistor 153.

The off thyratron OT has an anode 161, a cathode 163 and a control electrode 165. The hold network HN includes a capacitor 171 shunted by a fixed resistor 173 and a variable resistor 175. The anode 161 of the off thyratron OT is connected to the conductor AL1 through an anode resistor 177, the network ON and alternatively through the normally open contacts 89 of the relay RS or the switch SW. The cathode 163 of the thyratron OT is directly connected to the conductor AL2. The network HN is connected between the control electrode 165 and the cathode 163 of the thyratron OT through a grid resistor 179.

The auxiliary thyratron AT1 includes an anode 181, a cathode 183 and a control electrode 185. The network AN1 includes a capacitor 191 shunted by a fixed resistor 195 and has a time constant of the order of less than a period of the supply similar to the networks AN3 and AN4. The anode 181 of the thyratron AT1 is connected to the conductor AL2 through an anode resistor 197 and the network AN1. The cathode 183 is connected to the conductor AL1 alternatively through the normally open contacts 89 of relay RS and the switch SW. The off network ON is connected between the control electrode 185 and the cathode 183 of the thyratron AT1 through a grid resistor 199.

The thyratron AT2 has an anode 201, a cathode 203 and a control electrode 205. The network SN includes a capacitor 211 shunted by a fixed resistor 213 and a variable resistor 215. The anode 201 of thyratron AT2 is connected to the conductor AL2 through the network SN. The anode 201 is directly connected to the conductor AL2 through the network SN. The cathode 203 is directly connected to the conductor AL2. The network AN1 is connected between the control electrode 205 and the cathode 203 of the thyratron AT2 through a grid resistor 217.

The thyratron AT3 has an anode 221, a cathode 223 and a control electrode 225. The network AN2 includes a capacitor 231 shunted by a fixed resistor 233 and the secondary HS2 of the heater transformer HT2 for the thyratron AT2. The anode 221 of the thyratron AT3 is connected to conductor AL2 through an anode resistor 235, the pressure switch PS and the network AN2. The cathode 223 is directly connected to the conductor AL1. The network SN is connected between the control electrode 225 and the cathode 223 through a grid resistor 237.

The thyratron AT4 has an anode 241, a cathode 243 and a control electrode 245. The anode 241 and cathode 243 are connected in two branch circuits through the sections 251—253 and 261—253 of a double diode AD. In one of these branch circuits the anode 241 of the thyratron AT4 is connected through an anode resistor 263, the section 251—253 and the network AN3 to the conductor AL1. In the other branch the anode 241 is connected through the anode resistor 263, the other section 261—253, secondary 2AS of an auxiliary transformer 2AT and the network WN to the conductor AL2. The primary 2AP of the auxiliary transformer 2AT is supplied from the conductors AL1 and AL2. The network AN2 is connected between the control electrode 245 and the cathode 243 of the thyratron AT4 through a grid resistor 265.

The thyratron AT5 includes an anode 271, a cathode 273, a first control electrode 275 and a second control electrode 277. The anode 271 of the thyratron AT5 is connected to the conductor AL2 through an anode resistor 279 and the network HN. The cathode 273 is directly connected to the conductor AL1. The network AN4 is connected between the first control electrode 275 and the cathode 273 through a grid resistor 281. The second control electrode 277 is connected directly to the cathode through a contact 283 of the repeat-nonrepeat switch RNR in the repeat position of the switch RNR, and the network ON is adapted to be connected between this control electrode 277 and the cathode through a contact 285 of switch RNR in the non-repeat position and a grid resistor 287 on one side and through the normally open contacts 89 of relay RS or switch SW on the other side.

The Heat Control Unit includes a double triode HCT which is connected to a capacitor HC and the primary OP of the transformer OT in such manner that the capacitor HC is charged and discharged through the primary OP and through the sections of the double triode HCT. It is an important feature of this invention that the voltage for charging and discharging the capacitor HC is derived from the conductors AL1 and AL2, that is, from the transformer TT of the Sequence Timer.

The double triode HCT includes a pair of anodes 291 and 301, a pair of cathodes 293 and 303 and a pair of control electrodes 295 and 305. The cathodes 293 and 303 are connected together to the conductor OL. Between one of the anodes 301 and its associated cathode 303 a rectifier RX1 which may be of the dry type or of the high vacuum or gaseous type is connected in such a sense as to conduct oppositely to the conduction between this anode and cathode. The junction of the rectifier RX1 and its associated anode 301 of the double triode is connected to the conductor AL2 through the capacitor HC and the primary OP. The other anode 291 is connected directly to the conductor AL1. Since the anode 101 of the weld thyratron WT is connected to the conductor OL and the cathode 103 to conductor AL1, the weld thyratron WT is thus connected across the last mentioned anode 291 and cathode 293 of the double triode HCT in such a sense as to conduct oppositely to the conduction between this anode and cathode. The weld thyratron WT thus performs the same function with reference to its associated anode 291 and cathode 293 of the double triode as the rectifier RX1 performs with reference to its associated anode 301 and cathode 303. The primary OP and the capacitor HC are then connected in series with the sections 291—293 and 301—303 of the double triode HCT, the rectifier RX1 and the weld thyratron WT to the conductors AL1 and AL2 and charging current of both polarities may thus be supplied to the capacitor HC through the double triode, the rectifier RX1 and the weld thyratron WT and through the primary OP.

The double triode is controlled from a phase shift network PHN which is energized from the transformer 1AT. This transformer includes in addition to the secondaries 1AS1 and 1AS2 a third secondary 1AS3 which is of the type having an intermediate tap. Across the terminal taps of transformer 1AS3 a capacitor CPH is connected in series with a pair of variable resistors RPH and RPF. Between the intermediate tap and the junction of the capacitor CPH and the adjacent resistor RPH, a potential which is displaced in phase with reference to the potential between the conductors AL1 and AL2 to an extent depending on the setting of the variable resistors RPH and RPF thus appears. The resistor RPF is set to correspond to the power factor of the Welder and with the resistor RPF set the settings of the resistor RPH are varied to attain the desired heat.

The conductors LP1 and LP2 connected respectively to the intermediate tap of the secondary 1AS3 and the junction of the capacitor CPH and variable resistor RPH may be regarded as the output conductors of the phase shift network. Between these conductors LP1 and LP2 a pair of resistors 331 and 333 are connected and in addition, one of these conductors LP2 is connected to the control electrode 295 of one section 291—293 of the double triode HCT through a grid resistor 335 and the other conductor LP1 is connected through another grid resistor 337 to the control electrode 305 of the other section 301—303 of the double triode. The junction of the two resistors 331, 333 across the output conductors LP1 and LP2 of the phase shift network PHN is connected through a variable direct current voltage supply VS to the conductor OL. This voltage supply VS serves to vary the phase angle at which the heat control is effected for any setting of the heat control network PHN in situations in which it is desired to set the wave form of the welding pulse, that is, to produce slope-control during a weld.

A typical circuit for producing the direct current voltage (VS) is disclosed in my application entitled "Control for Resistance Welding," Serial No. 381,936, filed September 23, 1953 and assigned to Westinghouse Electric Corporation. To clarify the relationship between the apparatus shown in the last mentioned application and the apparatus disclosed in this application, the conductors between the junction of the resistors and the cathodes of the double triode HCT are labeled LE1 and LE2, which is the labeling applied to the same conductors of my above-mentioned application. In situations in which variation of the wave form of the welding pulse, that is so-called slope control, is not necessary, the variable D. C. voltage may be eliminated and in such case the conductors LE1 and LE2 are connected together.

So that the structure and operation of apparatus in accordance with my invention may be understood, it appears advisable at this point to list the actual components of apparatus which I have constructed and found to operate satisfactorily. The following table presents such a list:

| | |
|---|---|
| Ignitrons I-1 and I-2 | Any of the standard ignitrons available, the size depending on the magnitude of the welding current which is to be supplied. |
| Thyratrons FT1 and FT2 | WL 5796. |
| Grid resistors 55 and 65 | 100,000 ohms. |
| Resistors 43 and 53 | 17,000 ohms. |
| Capacitors 41 and 51 in biasing circuit | .5 microfarad. |
| Resistors RC1 and RC2 | 100,000 ohms. |
| Potential across secondaries 1AS1 and 1AS2 | 60 volts R. M. S. |
| Potential across OS1 and OS2 | 150 to 300 volts peak |
| Double triode HCT | 6SL7. |
| Grid resistors 335 and 337 | 100,000 ohms. |
| Potential between each terminal tap and intermediate tap of secondary 1AS3 | 57.5 volts R. M. S. |
| Capacitor CPH | .5 microfarad. |
| Variable resistor RPH | 6,000 ohms. |
| Power factor adjusting resistor RPF | 10,000 ohms. |
| Resistors 331, 333 | 60,000 ohms. |
| Capacitor HC | .05 microfarad. |
| Potential across TS | 115 volts R. M. S. |
| Surge suppressing capacitors (not labeled) | .001 microfarad. |

The Sequence Timer is of the usual structure and it is not necessary to list the dimensions of its components.

STANDBY—FIGS 1A AND 1B

In the standby condition of the apparatus shown in Figs. 1A and 1B the conductors L1 and L2 are energized by closing the circuit breakers or switches (not shown) through which they are supplied. In addition, the switch 351 in series with the weld-no weld relay RWN is closed and this relay is actuated so that the anodes 31 of thyratrons FT1 and FT2 are connected to the anodes 21 of their associated ignitrons and are capable of firing the ignitrons once the thyratrons are energized. But since the conductors L1 and L2 are energized, transformer TT is energized, conductors AL1 and AL2 are energized, primary 1AP and blocking bias (B1 and B2) is supplied through the secondaries 1AS1 and 1AS2 to the firing thyratrons and the latter are nonconducting.

In the Sequence Timer switch SW is open and relay RS is deenergized so that its normally open contacts 89 and 91 are open. Valve V is then closed and the electrodes E1 and E2 are separated and switch PS is open. In addition, thyratrons ST and AT1 are nonconducting because their anode circuits are open. Network AN1 is then discharged so that thyratron AT2 is conducting. Network SN is then charged, impressing a blocking bias on thyratron AT3 which is in any event nonconducting because the switch PS is open. Network AN2 is then uncharged and thyratron AT4 is conducting. Network AN3 and network WN are then charged so that thyratron WT and thyratron HT are nonconducting. Network AN4 is then uncharged so that thyratron AT4 is conducting, maintaining network HN charged and thyratron OT nonconducting. Network ON is then uncharged and thyratrons ST and AT1 are ready to conduct immediately on the closing of their anode circuits.

In the Heat Control Unit current cannot flow in the circuit including the right hand section 301—303 of the double triode HCT and the weld thyratron WT because the weld thyratron WT is nonconducting. But current can flow in the circuit including the rectifier RX1 and the left hand section 291—293 of the double triode HCT, and when the conductors AL1 and AL2 are first energized, current does flow in a circuit extending from conductor AL1 through the anode 291 and cathode 293 of the left hand section of double triode HCT, the rectifier RX1 to the capacitor HC and from the capacitor through the primary OP to the conductor AL2. This current charges the capacitor approximately to the potential equal to the amplitude of the potential supplied between the conductors AL1 and AL2 when the conductors AL1 and AL2 are first energized and the capacitor HC remains charged in this condition without further flow of current in the Heat Control Unit, because it cannot discharge through the right hand section 301—303 of the double triode HCT and the thyratron WT since WT is nonconducting. Thus thyratron WT not only provides a bypass for the section 291—293 of the double triode HCT but it also blocks the Heat Control Unit eliminating the necessity for a blocking tube and circuit. But, the capacitor is in readiness to discharge once thyratron WT is rendered conducting during a welding operation. The current pulse which is produced on the charging of capacitor HC does not fire ignitron I-2 because when this charging pulse flows the cathodes 293 and 303 of the double triode HCT (or of thyratrons which might be used in their place in accordance with the broader aspects of my invention) are at a relatively low temperature and the charging current which then flows is not sufficient to fire the ignitron.

Figure 2:
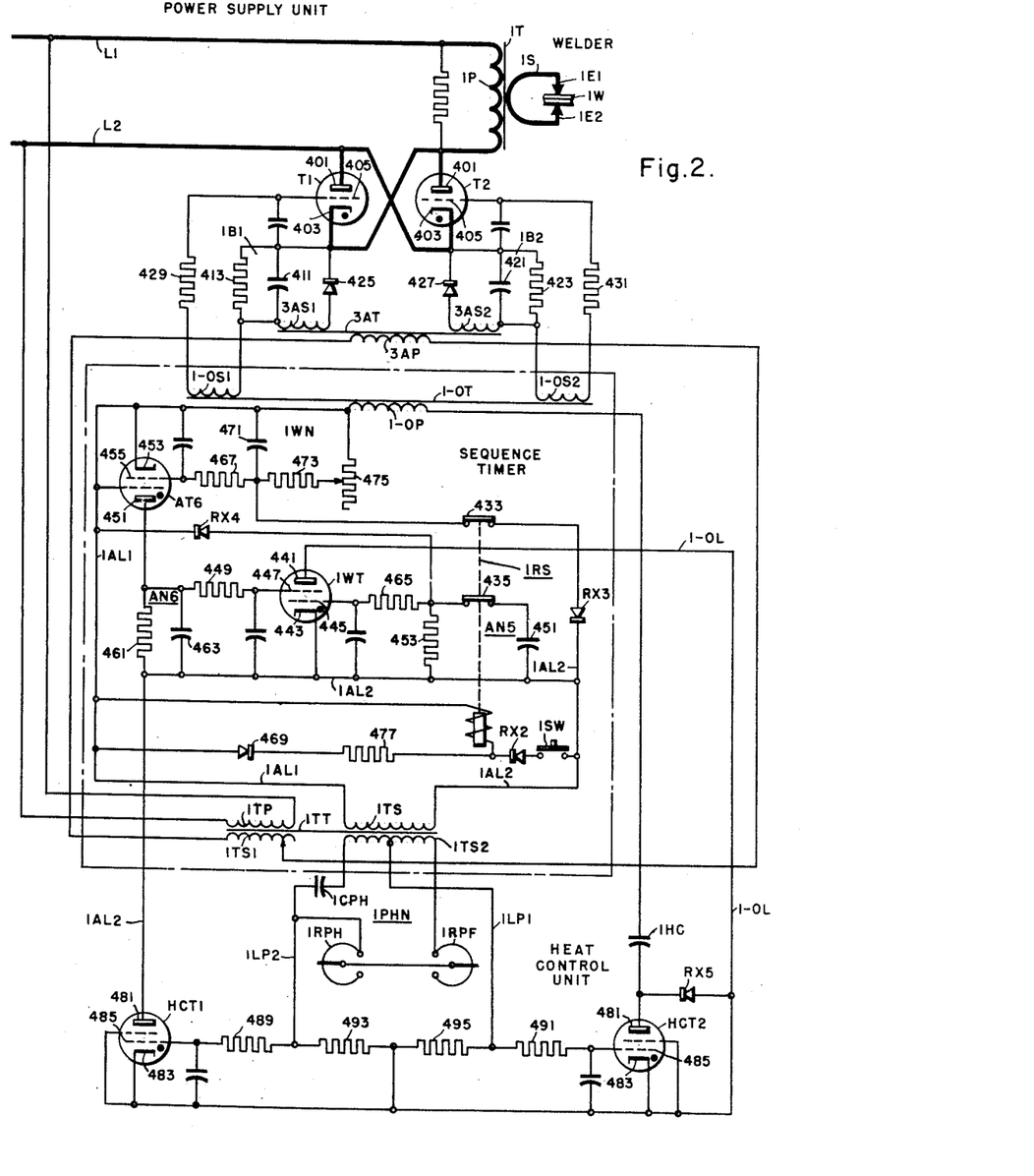
Fig. 2 is a circuit diagram of a modification of my invention.

OPERATION—FIGS 1 AND 2

The operation will be described with switch RNR in the repeat position. To start a welding operation, the work is placed between the electrodes E1 and E2 and switch SW is closed. The closing of the switch SW causes thyratrons ST and AT1 to conduct. The conduction of thyratron ST actuates relay RS which closes its normally open contacts 89 and 91. At contacts 89 the thyratrons ST and AT1 are locked in independently of the operation of the switch SW. At contacts 91 the circuit through the valve is closed so that the electrodes E1 and E2 clamp the work under pressure and the back pressure switch PS starts to close, closing when the pressure has reached a certain magnitude.

When thyratron AT1 becomes conducting, network AN1 is charged rendering thyratron AT2 nonconducting. The squeeze network SN then discharges, timing the squeeze interval. During this interval the pressure switch PS will have closed.

At the end of the squeeze interval network SN having timed out, thyratron AT3 is rendered conducting, charging network AN2. Thyratron AT4 is then rendered nonconducting. Networks AN3 and WN then time out. Network AN3 times out in a short interval of the order of less than a period of the supply permitting thyratron WT to conduct. Network WN times out after the substantially longer interval which constitutes the weld time. Transformer TT is so poled that thyratron WT conducts during the half period when the anode-cathode potential of ignitron I–1 is positive and it is set to conduct early during this half period at about 10° or 1/36 of a cycle after the zero instant.

When thyratron WT conducts, it affords a by-pass around the left-hand section 291—293 of double triode HCT and the capacitor HC may discharge and recharge to the opposite polarity when section 301—303 is rendered conducting. This occurs predominantly at an instant in the half period of the supply during which the thyratron WT conducts, determined by the setting of the phase shift network PH. At this time the potential of the supply AL1—AL2 is of the same polarity as the potential of capacitor HC, both impressing a positive potential on the anode 301. The potential between the anode 301 and cathode 303 is then substantially higher than the potential of the supply AL1—AL2. The capacitor HC then discharges and recharges in a circuit extending from its originally positively charged plate through the right-hand section 301—303 of the double triode HCT, the conductor OL, the thyratron WT, conductor AL1, secondary TS, conductor AL2, primary OP to the original negative plate of capacitor HC. This discharging and recharging continues until the capacitor HC is charged with its heretofore negative plate positive and its heretofore positive plate negative. A pulse is thus delivered through the primary OP which is of such polarity as to impress a bias counteracting potential across the secondary OS1 and the resistor RC1 in parallel with it to render thyratron FT1 conducting. Thyratron FT1 fires ignitron I–1 and a pulse of current is supplied through the primary P to produce welding current through the work W. The pulse produced by the discharge and recharge of the capacitor HC is short; it is terminated in less than a half period of the supply and if ignitron I–1 is rendered conducting near the beginning of its positive half period the discharge and recharge pulse is terminated substantially before the end of this positive half period. Thus the Heat Control Unit is ready to produce a second pulse at the beginning of the succeeding positive half period. This second pulse is now produced by the discharging and recharging of the capacitor HC. The capacitor is now discharged and recharged in a circuit extending from its recently charged positive plate through the primary OP, the conductor AL2, the secondary TS, the conductor AL1, the left-hand section 291—293 of double triode HCT, the rectifier RX1 to the other plate of the capacitor HC. The pulse which is now transmitted through the primary OP is such as to impress a pulse across the secondary OS2 to render thyratron FT2 conducting and ignitron I–2 conducts to supply current through the primary P. During the next half period thyratron WT again conducts and the capacitor HC is discharged and recharged as described above.

This operation continues so long at thyratron WT conducts, and thyratron WT conducts until the weld network WN times out to permit thyratron HT to conduct. Network AN4 is then charged to render thyratron WT nonconducting. During the last half period during which thyratron WT conducted capacitor HC is charged with its plate connected directly to the primary OP positive and the other plate negative. During the succeeding half period when the left hand section 291—293 of double triode HCT is rendered conducting, the capacitor HC is recharged to its initial condition in which its plate connected to the primary OP is negative. This discharging and recharging causes ignitron I–2 to conduct. Since ignitron I–2 is the second to conduct during each operating cycle of the ignitrons, the operation just described is such as to lead to the supply of current during an even number of half periods, and thus the difficulties of magnetization of the welding transformer T by the supply of current during an odd number of half periods is avoided.

After thyratron WT has been rendered nonconducting and the capacitor HC has been recharged to its initial condition, the Heat Control Unit and the Power Supply Unit are quiescent but the operation of the Sequence Timer continues. In addition to rendering the thyratron WT nonconducting, the charging of network AN4 renders thyratron AT5 nonconducting. The hold network HN now discharges. At the end of the hold time the network HN times out, rendering thyratron OT conducting and thus charging network ON. The charging of network ON renders thyratron ST nonconducting and relay RS becomes deenergized, opening its contacts 89 and 91. The circuit through the valve V is now opened and the electrodes E1 and E2 are disengaged from the work W. In addition, the lock-in circuit across the switch SW is opened and unless the switch SW remains closed, the welding operation is not repeated.

For the purpose of describing the operation, it may be assumed that switch SW does remain closed. Under such circumstances the sequence continues. In spite of the fact that switch SW remains closed, thyratron ST and thyratron AT1 remain nonconducting because network ON is charged. Since thyratron AT1 is nonconducting, network AN1 is permitted to discharge and it discharges in a short time interval of the order of a period of the supply or less sufficiently to permit thyratron AT2 to conduct. Network SN is then charged to render thyratron AT3 nonconducting if it has not already been rendered so by the opening of the switch PS. Network AN2 then discharges in a short time interval of the order of a period of the supply to permit thyratron AT4 to conduct. Networks AN3 and WN are then charged. Network AN3 has no effect since thyratron WT is already nonconducting. Network WN when charged causes thyratron HT to become nonconducting. Network AN4 then discharges in a time interval of the order of a half period or less. This discharge of the network AN4 has no effect on thyratron WT which is maintained nonconducting by network AN3. But thyratron AT5 is permitted to conduct to charge network HN. Thyratron OT is then rendered nonconducting, stopping the charging of network ON and permitting the latter to discharge during the off interval. When network ON has timed out the Sequence Timer is reset and a welding operation as described above may be repeated if switch SW remains closed.

DESCRIPTION—FIG. 2

The apparatus shown in Fig. 2 is particularly suitable for situations in which welds requiring low power are to be produced with a machine of relatively simple structure such for example, as a machine in which the work is clamped between the electrodes by a manual operation. Such apparatus is often used in the welding of the parts of a radio tube assembly. This apparatus requires a relatively simple sequence timer having facilities only for timing the weld, since the other parts of the welding operation are carried out manually.

Like the apparatus shown in Figs. 1A and 1B, the apparatus shown in Fig. 2 includes a Welder, a Power Supply Unit, a Sequence Timer and a Heat Control Unit. This apparatus is supplied from conductors L1 and L2 in the same manner as the Fig. 1 apparatus. Power for the Sequence Timer and the Heat Control Unit is derived from a pair of conductors 1AL1 and 1AL2 which are energized from the secondary 1TS of a transformer 1TT common to the Heat Control Unit and the Sequence Timer.

The Welder includes a transformer 1T having a primary 1P and a secondary 1S. Electrodes 1E1 and 1E2 are connected to the terminals of the secondary 1S. The Welder is provided with manual facilities for clamping the electrodes 1E1 and 1E2, work 1W and for disengaging the electrodes from the work which do not concern my invention and are not shown in detail. The primary 1P is shunted by a resistor which suppresses surges.

The Power Supply Unit includes a pair of thyratrons T1 and T2, each having an anode 401, a cathode 403 and a control electrode 405. The anodes 401 and cathode 403 of the thyratrons T1 and T2 are connected in inverse parallel between the primary 1P and the conductors L1 and L2 so that alternating current as determined by the conduction of the thyratrons T1 and T2 may be supplied through the primary 1P. Facilities are provided for impressing between the control electrode 405 and the cathode 403 of each thyratron T1 and T2 a blocking bias potential and a potential for counteracting the bias potential, the latter being determined by the operation of the Sequence Timer and the Heat Control Unit. The blocking bias potential is in each case derived from the secondary 3AS1 and 3AS2 of an auxiliary transformer 3AT, the primary 3AP of which derives its potential from a secondary 1TS1 of the transformer 1TT. The secondary 1TS1 is provided with an adjustable tap. The potential from each of the secondaries 3AS1 and 3AS2 is impressed on a biasing network 1B1 and 1B2, each of which consists of a capacitor 411 and 421 shunted by a resistor 413 and 423, through a rectifier 425 and 427 poled to impress potential of proper polarity on the network. The counteracting potential for each thyratron is derived from the secondaries 1-OS1 and 1-OS2 of an output transformer 1-OT, the primary 1-OP of which is supplied from the Heat Control Unit. Between the control electrode 405 and the cathode 403 of each thyratron T1 and T2 the associated biasing network 1B1 or 1B2 is connected in series with an associated secondary 1-OS1 or 1-OS2 and an associated grid resistor 429 and 431. When the Sequence Timer and Heat Control Unit are quiescent, there is no potential across the secondaries 1-OS1 and 1-OS2 and the thyratrons T1 and T2 are biased to nonconduction.

The Sequence Timer is of the type disclosed in my copending application Serial No. 411,385 of which this application is a continuation-in-part. It includes a weld thyratron 1WT and an auxiliary thyratron AT6, a weld network 1WN and a plurality of auxiliary networks AN5 and AN6. It also includes a start relay 1RS having normally closed contacts 433 and 435.

The weld thyratron 1WT has an anode 441, a cathode 443, a first control electrode 445 and a second control electrode 447. The auxiliary network AN5 has a capacitor 451 which is shunted by a resistor 453 through the normally closed contacts 435 of the relay 1RS. The time constant of this network AN5 is of the order of a period of the supply or less. The network AN6 includes a capacitor 463 shunted by a resistor 461 and this network also has a relatively short time constant of the order of a period of the supply or less. The anode 441 of the thyratron 1WT is connected to an output conductor 1-OL which terminates in the Heat Control Unit. The cathode 443 is connected to the conductor 1AL2.

The network AN5 is connected between the first control electrode 445 and the cathode 443 through a grid resistor 465. The network AN6 is connected between the second control electrode 447 and the cathode 443 through another grid resistor 449.

The thyratron AT6 has an anode 451, a cathode 453 and a control electrode 455. The network 1WN includes a capacitor 471 shunted by a fixed resistor 473 and a variable resistor 475. The anode 451 of thyratron AT6 is connected to the conductor 1AL2 through the network AN6. The cathode 453 is connected to the conductor 1AL1. The network 1WN is connected between the control electrode 455 and the cathode 453 through a grid resistor 467.

The exciting coil of the relay 1RS is adapted to be connected between conductor 1AL2 and conductor 1AL1 through the starting switch 1SW of the apparatus and through a rectifier RX2 poled to conduct positive current from the conductor 1AL2 to the coil. The coil is shunted by a rectifier 469 in series with a resistor 477, the rectifier being poled to conduct current oppositely to that conducted by the rectifier RX2 in series with the switch 1SW. The network 1WN is also connected between conductors 1AL1 and 1AL2 through contacts 433 and another rectifier RX3 and network AN5 is connected between conductors 1AL1 and 1AL2 through a further rectifier RX4. The relationship between the relay 1RS, the rectifier in series with its coil and the other components is described in my application Serial No. 411,385.

The Heat Control Unit is similar to that disclosed in connection with Figs. 1A and 1B but in lieu of a double triode it includes a pair of thyratrons HCT1 and HCT2. The Heat Control Unit also includes a capacitor 1HC similar to the capacitor HC of my preferred embodiment. The thyratrons HCT1 and HCT2 each has an anode 481, a cathode 483 and a control electrode 485. The anode 481 of thyratron HCT1 is connected to conductor 1AL2; the cathode 483 is connected to conductor 1-OL. The anode 481 of thyratron HCT2 is connected through capacitor 1HC and the primary 1-OP to the conductor 1AL1; the cathode 483 is connected to the conductor 1-OL. The anode 481 and cathode 483 of thyratron HCT2 are shunted by a rectifier RX5 which is connected to conduct oppositely to the anode and cathode which it shunts. With respect to thyratron HCT1 the thyratron 1WT of the Sequence Timer performs the same function as the rectifier RX5, its anode 441 being connected to the cathode 483 of thyratron HCT1 through the conductor 1-OL and its cathode 443 being connected to the anode 481 of thyratron HCT1.

Thyratrons HCT1 and HCT2 are controlled together from a phase shift network 1PHN. This network derives its potential from a secondary 1TS2 of the transformer 1TT, which has an intermediate tap. Across the terminals of this secondary 1TS2 a capacitor 1CPH and a pair of variable resistors 1RPH and 1RPF are connected in series. One of these resistors 1RPF is set to correspond to the power factor of the Welder and the other 1RPH may be set during an operation to adjust the instants in the periods of the supply when the thyratrons T1 and T2 are rendered conducting. The output terminals of the network 1PH are a conductor 1LP2 extending from the junction of the capacitor 1CPH and the adjacent variable resistor 1RPH and a conductor 1LP1 extending from the intermediate tap. These terminals are connected each to a control electrode 485 of a thyratron HCT1 and HCT2 through an associated grid resistor 489 and 491. Across the conductors 1LP1 and 1LP2 a pair of resistors 493 and 495 are connected. The junction of these resistors 493 and 495 is connected to the cathodes 483 of the thyratrons HCT1 and HCT2. The potential from the phase shift network 1PH is thus impressed in opposite phase between the control electrodes 485 and the cathodes 483 of the thyratrons HCT1 and HCT2.

Apparatus which I have found to operate satisfactorily includes the following components:

| | |
|---|---|
| Thyratrons T1 and T2 | WL 5684. |
| Grid resistors 429 and 431 for thyratrons T1 and T2 | .47 megohm. |
| Surge capacitors (unlabeled) for thyratrons T1 and T2 | .001 microfarad. |
| Resistors 413 and 423 | 68,000 ohms. |
| Capacitors 411 and 421 | .5 microfarad. |
| Secondaries' 3AS1 and 3AS2 output potential | 60 volts R. M. S. |
| Secondaries' 1–OS1 and 1–OS2 output potential | 150–300 volts peak. |
| Thyratrons AT6, 1WT, HCT1 and HCT2 | WL 2050. |
| Grid resistors 447, 449, 467, 489, 491 for thyratrons AT6, 1WT, HCT1 and HCT2 | All .1 megohm. |
| Surge capacitors (unlabeled) for thyratrons AT6, 1WT, HCT1 and HCT2 | All .002 microfarad. |
| Capacitor 451 network AN5 | .5 microfarad. |
| Resistor 453 network AN5 | 15,000 ohms. |
| Capacitor 461 network AN6 | .5 microfarad. |
| Resistor 463 network AN6 | 15,000 ohms. |
| Capacitor 471 network 1WN | .5 microfarad. |
| Fixed resistor 473 network 1WN | 4,700 ohms. |
| Variable resistor 475 network 1WN | A plurality of resistors separated by taps each 6,000 ohms. |
| Potentials between midtap and terminals of secondary 1TS2 | About 57.5 volts R. M. S. |
| Capacitor 1CPH network 1PH | 1 microfarad |
| Phase shift resistor 1RPH | 5,000 ohms. |
| Power factor resistor 1RPF | 5,000 ohms. |
| Resistors 493 and 495 across network 1PH | Each 60,000 ohms. |
| Potential of secondary 1TS | 115 volts. |
| Relay | Westinghouse Style No. 1626261. |
| Rectifier RX2 in series with coil of relay 1RS | Westinghouse Style No. 15999444 (selenium). |
| Other rectifiers | All Westinghouse Style No. 1501171 (selenium) |

It is to be understood that the above components may be changed in a manner known to those skilled in the art over a wide range both as regards their types and as regards their magnitudes and the above table is presented, only to help those who may make apparatus in accordance with my application, with the understanding that it in no way limits the scope of my invention.

STANDBY—FIG. 2

In the standby condition of the apparatus shown in Fig. 2 the conductors L1 and L2 are energized. The conductors 1AL1 and 1AL2 are then also energized and the blocking bias (1B1 and 1B2) is impressed on the thyratrons T1 and T2 through the transformer 3AT. Network 1WN is charged through normally closed contacts 433 of the relay 1RS and the rectifier RX3 so as to block thyratron AT6. Network AN6 is then uncharged. Network AN5 is charged through rectifier RX4 so as to block thyratron 1WT. This thyratron is then nonconducting.

Since thyratron 1WT is nonconducting there is no bypass across thyratron HCT1 to permit the conduction of thyratron HCT2 and the charging or discharging of capacitor 1HC through thyratrons 1WT and HCT2 is prevented. The rectifier RX5 which bypasses thyratron HCT2 on the other hand is capable of conducting and thyratron HCT1 also may conduct when capacitor 1HC is uncharged during a half period of the supply during which the potential between the anode 481 and the cathode 483 of thyratron HCT1 is positive, and at an instant in this half period set by the network 1PH. During the first of these positive half periods following the energization of conductors L1 and L2 thyratron HCT1 does conduct and current flows in a circuit extending from conductor 1AL2 through the anode 481 and cathode 483 of thyratron HCT1, rectifier RX5, capacitor 1HC, primary 1—OP to conductor 1AL1. This current is of too small a magnitude to fire thyratron T2 because at this time the cathodes 483 of thyratrons HCT1 are at a relatively low temperature. The capacitor 1HC is thus charged with its plate connected to the anode 481 of thyratron HCT2 positive and the other plate negative. Once this capacitor 1HC is charged it prevents further current flow through the charging network including the thyratron HCT1 and remains charged. Thus in the standby condition of the apparatus the capacitor 1HC is charged to a polarity such that it would tend to conduct through thyratron HCT2 if the circuit including the anode 481 and cathode 483 of this thyratron were closed. The potential across capacitor 1HC at this time is approximately equal to the amplitude of the potential between the conductors AL1 and AL2.

OPERATION—FIG. 2

To initiate a welding operation the start switch 1SW is closed. The closing of this switch actuates relay 1RS. As is explained in my application 411,385 the cooperation of the switch, the rectifier, the relay 1RS and the other components is such that in spite of the random operation of the switch 1SW, the Sequence Timer operates synchronously.

The actuation of relay 1RS opens the normally closed contacts 433 and 435 of this relay. The opening of contacts 435 disconnects the capacitor 451 of network AN5 from the resistor 453 and from the first control electrode 445 of the thyratron 1WT. Thyratron 1WT is then rendered conducting at the beginning of the first positive half period of the supply following the opening of the contacts 435. When thyratron 1WT conducts, it permits thyratron HCT2 to conduct and the latter is rendered conducting at an instant in the positive half period of the supply corresponding to the setting of the network 1PH. The capacitor 1HC is now discharged and recharged current flowing from the originally positive plate of the capacitor through the anode 481 and cathode 483 of thyratron HCT2, the conductor 1OL, the anode 441 and cathode 443 of thyratron 1WT, to the conductor 1AL2, the secondary 1TS, the conductor 1AL1, the primary 1—OP to the originally negative plate of capacitor 1HC. A pulse is then transmitted through the primary 1-OP and corresponding pulses are induced in the secondaries 1–OS1 and 1–OS2. These pulses are of such polarity that thyratron T1 for which the anode-cathode potential is positive becomes conducting and conducts current through the primary 1P. Welding current is thus supplied to the work 1W. The discharging and recharging of the capacitor 1HC is completed in less than a half period.

During the discharging and recharging operation the capacitor 1HC is charged with its plate connected to the primary 1–OP positive and the other plate negative. The capacitor 1HC when charged blocks the further flow of current through the last described charging circuit and remains in this charged condition until thyratron HCT1 is rendered conducting at an instant determined by the setting of the network 1PH. At this time, current flows from the positive plate of the capacitor through the primary 1–OP to the conductor 1AL1 through the secondary 1TS, the conductor 1AL2, the anode 481 and cathode 483 of thyratron HCT1, the rectifier RX5 which bypasses thyratron HCT2 to the negative plate of capacitor 1HC. The capacitor is thus discharged and recharged to the opposite polarity and a second pulse is transmitted to the primary 1-OP. This second pulse induces potential in the secondary 1-OS2 to render thyratron T2 conducting and current of the opposite polarity now flows through primary 1P. Subsequently, thyratron 1WT again becomes conducting and capacitor 1HC is again discharged and recharged to the opposite polarity with thyratron T1 being rendered conducting. This operation continues so long as thyratron 1WT conducts and this conduction is determined by the timing operation of network 1WN.

The charging of network 1WN is interrupted when relay 1RS is actuated and its normally closed contacts 433 in the charging circuit is opened. Network 1WN then discharges and at the end of the weld interval it times out permitting thyratron AT6 to conduct. When the latter conducts, it impresses blocking potential on network AN6 to prevent further conduction of thyratron 1WT. During the half period following the last half period during which thyratron 1WT conducted, capacitor 1HC is discharged and recharged to the opposite polarity through thyratron HCT1 and the rectifier RX5 and thyratron T2 is rendered conducting to supply welding current for the last time. The operation is now complete, a welding pulse has been supplied during an even number of half periods of the supply L1-L2.

Conclusion

I have disclosed here welding apparatus including heat control facilities of relatively simple structure which permits variation of the welding current over a wide range from zero to the maximum available through the main discharge device I-1, I-2, or T1, T2 used. In addition, in apparatus as disclosed here, the supply of current during an even number of half periods of the supply is assured and undesirable magnetization of the welding transformer is prevented.

While I have disclosed certain specific embodiments of my invention, many modifications thereof are possible. In particular, as regards the modification shown in Figs. 1A and 1B, it is to be kept in mind that my invention in its broader aspects may be practiced with a thyratron, as in the Fig. 2 modification, in place of each section of the double triode HCT, HCT1 and HCT2. My invention then is not to be restricted except insofar as is necessitated by the spirit of the prior art.

I claim as my invention:

1. Apparatus for controlling the supply of welding current in resistance welding including a sequence timer having a discharge device having an anode and a cathode and means for rendering said device conducting only during weld intervals; and a heat control unit having a first terminal and a second terminal for supplying a main alternating potential, a third terminal and a fourth terminal for supplying a control potential displaced in phase with respect to said main alternating potential and output means, the said apparatus being characterized by a second electric discharge device having an anode, a cathode and a control electrode; a capacitor; rectifier means; means connecting in series said first and second terminals, said capacitor, said rectifier means, said output means and said anode and cathode of said second device; means for connecting said anode and cathode of said first named device and said anode and cathode of said second device in inverse parallel; a third electric discharge device having an anode, a cathode and a control electrode; means connecting said anode and cathode of said third device in inverse parallel with said rectifier and means connecting said third and fourth terminals each to one of said control electrodes.

2. Apparatus according to claim 1 characterized by the fact that the second and third discharge devices are the discharge paths of a double triode.

3. Apparatus for controlling the supply of welding current in resistance welding including a sequence timer having a discharge device having an anode and a cathode and means for rendering said device conducting only during weld intervals; and a heat control unit having a second electric discharge device having an anode, a cathode and a control electrode; a third electric discharge device having an anode, a cathode and a control electrode; output means; alternating current supply means; means connecting said anodes and cathodes in a circuit with said output means and said alternating current supply means such that said second and third devices respectively are capable of conducting currents of opposite polarity through said output means during alternate half periods of said alternating current; rectifier means; means connecting said rectifier means to bypass said anode and cathode of said third device when said second device is conducting; and means connected to said control electrodes to render said second and third devices conducting at predetermined instants in the half periods of said alternating current; the said apparatus being characterized by means for connecting said anode and cathode of said first named device to bypass said anode and cathode of said second device when said third device is conducting.

4. In combination, a first high vacuum electric discharge device having an anode, a cathode and a control electrode; a second high vacuum electric discharge device having an anode, a cathode and a control electrode; first and second alternating current power supply terminals; a capacitor, a rectifier having an anode and a cathode; output means; means connecting in a series conductive network said anode and cathode of said first device, said output means, said first and second terminals, said capacitor and said anode and cathode of said rectifier; said anode of said first device and said cathode of said rectifier being at opposite phase potentials in said network; means connecting said anode and cathode of said second device in inverse parallel to said anode and cathode of said rectifier; and control means connected to said control electrodes.

5. In combination a first high vacuum electric discharge device having an anode, a cathode and a control electrode; a second high vacuum electric discharge device having an anode, a cathode and a control electrode; first and second alternating current power supply terminals; a capacitor; a rectifier having an anode and a cathode; output means; means connecting in a series conductive network said anode and cathode of said first device, said output means, said first and second terminals, said capacitor and said anode and cathode of said rectifier; said anode of said first device and said cathode of said rectifier being at opposite phase potentials in said network; means connecting said anode and cathode of said second device in inverse parallel to said anode and cathode of said rectifier; a third electric discharge device having an anode and a cathode; means connecting said anode and cathode of said third device in inverse parallel with said anode and cathode of said first device; and control means connected to said control electrodes.

6. Apparatus for welding and the like including a sequence timer and a heat control unit, said sequence timer including a weld discharge device having an anode and a cathode, and means for rendering said device conducting during a weld interval and said heat control unit including a first heat control discharge device having an anode and a cathode, a second heat control discharge device having an anode and a cathode, output impedance means, alternating current power supply conductors, a capacitor, asymmetrical conductive means, means connecting said asymmetrical means to the anode and cathode of said first heat control device to conduct oppositely to said first heat control device, means connecting in series in an asymmetrical conducting network said conductors, said asymmetrical means, said impedance means, and said second heat control device and means connected to said heat control devices for rendering them conductive at predetermined instants in the periods of said alternating current; the said apparatus being characterized by means connecting said anode and cathode of said weld device to said anode and cathode of said second heat control device to conduct oppositely to said second heat control device.

7. Apparatus for welding and the like including a sequence timer and a heat control unit, said sequence timer including a transformer having a primary and a secondary, a plurality of electrical components, and means for connecting said components in an electrical circuit with said secondary such that said secondary supplies the proper potential to said components, among said components being included a weld electric discharge device having an anode and a cathode and means for rendering said device conducting during a weld interval, and said heat control unit including a first heat control electric discharge device having an anode and a cathode, a second heat control electric discharge device having an anode and a cathode, output impedance means, a capacitor, asymmetrically conductive means, and means connecting said asymmetrically conductive means to the anode and cathode of said first heat control device to conduct oppositely to said first heat control device; the said apparatus being characterized by means connecting said anode and cathode of said weld device to said anode and cathode of said second heat control device to conduct oppositely thereto and by means connecting in series, between said first heat control device and said asymmetrically conductive device and said second heat control device and said weld device, said capacitor, said output impedance means and said secondary.

8. Apparatus according to claim 7 wherein the first and second heat control devices are the discharge paths of a double triode.

9. In combination a first electric discharge device having an anode and a cathode, rectifier means connected in anti-parallel with said anode and cathode, power supply means, a capacitor, a second electric discharge device having an anode and a cathode, a control electric discharge device having an anode, a cathode and a control electrode, means connecting in anti-parallel said anode and cathode of said second device and said anode and cathode of said control device, means for connecting in series said anode and cathode of said first device, said power supply means, said capacitor and said anode and cathode of said control device, and means connected to said control electrode for maintaining said control device nonconducting and for rendering it conducting at intervals.

10. In combination alternating current power supply means having a first terminal and a second terminal, a capacitor, a first electric discharge device having an anode, a cathode and a control electrode, a second electric discharge device having an anode, a cathode and a control electrode, a third electric discharge device having an anode, a cathode and a control electrode, a rectifier, means connecting in series said first and second terminals, said rectifier, said anode and cathode of said first device and said capacitor, said rectifier being poled to conduct the current flow between said anode and cathode of said first device, means connecting said anode and cathode of said second device in inverse parallel with said rectifier, means connecting said anode and cathode of said third device in inverse parallel with said anode and cathode of said first device, means connected to the control electrode and cathode of said first device for impressing potential between said control electrode and cathode of said first device which is displaced in phase with reference to said alternating potential, means connected to the control electrode and cathode of said second device for impressing potential between said control electrode and cathode of said second device which is substantially in opposite phase to the potential impressed between said control electrode and cathode of said first device, and means connected to the control electrode of said third device for impressing a potential thereon to maintain said third device normally non-conducting and to render it conducting during a predetermined time interval.

References Cited in the file of this patent

UNITED STATES PATENTS

| | | |
|---|---|---|
| 2,140,350 | Dawson | Dec. 13, 1938 |
| 2,574,373 | Bivens | Nov. 6, 1951 |